US005165344A

United States Patent [19]

Matsumoto et al.

[11] Patent Number: 5,165,344

[45] Date of Patent: Nov. 24, 1992

[54] DAMPENING WATER COMPOSITION FOR LITHOGRAPHIC PRINTING AND METHOD FOR LITHOGRAPHIC PRINTING

[75] Inventors: Hiroshi Matsumoto; Kenji Kunichika; Toshio Uchida, all of Shizuoka, Japan

[73] Assignee: Fuji Photo Film Co., Ltd., Minami-ashigara, Japan

[21] Appl. No.: 780,202

[22] Filed: Oct. 22, 1991

[30] Foreign Application Priority Data

Oct. 25, 1990 [JP] Japan .................................. 2-288244

[51] Int. Cl.[5] ........................... B41F 1/18; C09K 3/18

[52] U.S. Cl. ......................................... 101/451; 106/2

[58] Field of Search ............................. 106/2; 101/451

[56] References Cited

U.S. PATENT DOCUMENTS

| | | | |
|---|---|---|---|
| 4,475,460 | 10/1984 | Matsumoto | 106/2 |
| 4,548,645 | 10/1985 | Thiebaut | 106/2 |
| 4,764,213 | 8/1988 | Gventer et al. | 106/2 |
| 4,798,627 | 1/1989 | Schmitt et al. | 106/2 |
| 5,054,394 | 10/1991 | Zweig | 106/2 |
| 5,096,487 | 3/1992 | Schell | 106/2 |

FOREIGN PATENT DOCUMENTS

| | | |
|---|---|---|
| 0358113A2 | 3/1990 | European Pat. Off. . |
| 2087405A | 5/1982 | United Kingdom . |

*Primary Examiner*—Shrive Beck
*Assistant Examiner*—Helene Klemonski
*Attorney, Agent, or Firm*—Burns, Doane, Swecker & Mathis

[57] ABSTRACT

A dampening water composition for lithographic printing plate comprises a hydrophilic polymer having a film-forming ability, a pH-buffering substance and at least one compound selected from the group consisting of benzimidazole and derivatives thereof. The dampening water composition can effectively suppress the corrosion of copper or copper alloy-plated rolls of a printing press as well as cast iron or nickel-plated cast iron parts thereof without impairing printing effects and printability.

20 Claims, No Drawings

DAMPENING WATER COMPOSITION FOR LITHOGRAPHIC PRINTING AND METHOD FOR LITHOGRAPHIC PRINTING

BACKGROUND OF THE INVENTION

The present invention relates to a dampening water composition for lithographic printing and in particular to a dampening water composition excellent in anticorrosive ability against parts of a printing press made of copper and alloys thereof or cast iron as well as plated parts thereof and a lithographic printing method using the same.

The lithographic printing is a printing system which makes the most use of the properties that water and an oil are not intermingled with one another. Thus, the printing plate used in such system comprises a surface region which receives water, but repels an oil-based ink and a surface region which repels water, but receives an oil-based ink, wherein the former serves as a non-image area, while the latter serves as an image area. A desensitizing gum serves to increase the surface-chemical difference between the image and non-image areas and hence the ink repellency of the non-image area and ink-receptivity of the image area by wetting the non-image area with a dampening water containing the desensitizing gum.

In the practice of printing, a dampening water is first supplied to the plate surface through rollers for applying water and then a lithographic ink is applied onto the plate surface through three or four rollers for applying ink. Therefore, the dampening water exists on mixing rolls of the printing press in the form of drops or a layer of water since the dampening water is transferred thereto through the lithographic ink on the ink-applying rollers which come in contact with the plate surface.

For this reason, it is sometimes observed that a sufficient amount of the water-repellent lithographic ink is not adhered to the mixing rolls of the printing press. This phenomenon is generally called "roller stripping". To suppress the occurrence of this phenomenon as much as possible, there has widely been used a printing press in which a part of the mixing roll is made of copper or a copper alloy having high affinity for oils. When such a printing press is employed in printing, an ink is distributed only to the image areas on a lithographic printing plate, while the hydrophilic state of the non-image area is maintained and the ink is transferred to paper through a rubber blanket. An impression cylinder (which is made of cast iron and nickel- or chromium-plated or burnished) comes in contact with the blanket during this operation.

Thus, when the printing is performed using a printing press equipped with copper or copper alloy-plated rolls and/or an impression cylinder, the copper or copper alloy-plated rolls and/or the impression cylinder often suffer corrosion or rust depending on the kinds or amounts of additives incorporated into the dampening water. Therefore, there has long been a desire for the development of a dampening water which can prevent the corrosion of these parts of the printing press.

Under such circumstances, there have been proposed various methods for solving these problems. For instance, U.S. Pat. No. 4,548,645 discloses the use of a polycarboxylic acid and salts thereof with organic bases such as amine salts. In addition, DEOS No. 3,536,485 discloses the use of a dampening water to which a thickener, a citrate buffer, a surfactant and copper ions are added to eliminate the problem of corrosion. European patent application Ser. No. 0108883 discloses a method for preventing the corrosion which uses a dampening water composition containing 1H-benzotriazole. These dampening water compositions are effective for preventing the corrosion of the parts made of copper or copper alloys, but are not always effective for preventing the corrosion of cast iron parts and nickel-plated cast iron parts.

SUMMARY OF THE INVENTION

Accordingly, the object of the present invention is to provide a dampening water composition which can securely suppress the corrosion of metal parts used in a printing press such as those of copper, copper alloys or cast iron or nickel-plated cast iron parts over a long period of time and which never deteriorates the printing quality of the aluminum surface of a lithographic printing plate.

The inventors of this invention have conducted various studies to achieve the foregoing object, have found out that the use of a specific compound or a derivative thereof is effective for eliminating the foregoing problems and thus have completed the present invention.

According to the present invention, the foregoing object can effectively be achieved by providing a dampening water composition for lithographic printing plate which comprises a hydrophilic polymer having a film-forming ability and a pH-buffering substance wherein it further comprises at least one compound selected from the group consisting of benzimidazole and derivatives thereof.

DESCRIPTION OF THE PREFERRED EMBODIMENTS

The dampening water composition of the present invention will hereunder be described in more detail.

The benzimidazole and derivatives thereof which may suitably be used in the present invention are represented by the following general formula (I):

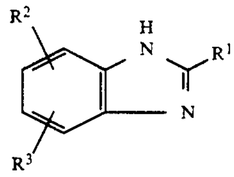

(I)

Wherein $R^1$ represents H, SH, Cl or Br; and $R^2$ and $R^3$ each independently represents H, a $C_1$ to $C_5$ alkyl or alkoxy group, a halogen atom such as Cl or Br or $SO_3M$ (M represents H, an alkali metal or $NH_4$).

The dampening water composition for lithographic printing can exhibit an ability of preventing corrosion of copper or copper alloy-plated rolls used in a printing press and parts thereof made of cast iron or nickel-plated cast iron without deteriorating contamination-resistant and plate surface-protecting effects of the dampening water by the addition of at least one of the foregoing compounds thereto.

The amount of these compounds to be incorporated into the dampening water composition upon using the same preferably ranges from 0.0001 to 5% by weight and more preferably 0.0002 to 3% by weight on the basis of the weight of the composition practically used.

These compounds may of course be used alone or in combination.

The dampening water composition of the present invention further comprises a hydrophilic polymer having a film-forming ability as an essential component. Examples of the hydrophilic polymers include natural products and modified products thereof such as gum arabic, starch derivatives (for instance, dextrin, enzyme-decomposed dextrin, hydroxypropylated enzyme-decomposed dextrin, carboxymethylated starch, phosphated starch and octenylsuccinylated starch), alginic acid salts, cellulose derivatives (for instance, carboxymethyl cellulose, carboxyethyl cellulose, hydroxyethyl cellulose, methyl cellulose, hydroxypropyl cellulose, hydroxypropylmethyl cellulose and glyoxal-modified derivatives thereof); and synthetic polymers such as polyethylene glycol and copolymer thereof; polyvinyl alcohol and derivatives thereof; polyvinyl pyrrolidone; polyacrylamide and copolymer thereof; polyacrylic acid and copolymer thereof; vinyl methyl ether/maleic anhydride copolymer; vinyl acetate/maleic anhydride copolymer; and polystyrenesulfonic acid and copolymer thereof. These polymers may be incorporated into the dampening water composition alone or in combination and they can be added thereto so that the concentration thereof preferably ranges from 0.005 to 1% by weight on the basis of the practically used dampening water composition.

Another essential component of the dampening water composition is a pH-buffering agent which can be selected from the group consisting of water-soluble organic acids, water-soluble inorganic acids and salts thereof and which exhibits a pH-controlling or buffering effect, an effect of properly etching the surface of a substrate for a lithographic printing plate or a corrosion-inhibitory effect. Examples of preferred organic acids are citric acid, ascorbic acid, malic acid, tartric acid, lactic acid, acetic acid, gluconic acid, hydroxyacetic acid, oxalic acid, malonic acid, levulinic acid, sulfanilic acid, p-toluenesulfonic acid, phytic acid and organic phosphonic acid. Examples of inorganic acids are phosphoric acid, metaphosphoric acid, nitric acid and sulfuric acid. Further, examples of salts of these organic and/or inorganic acids are alkali metal salts, alkaline earth metal salts and ammonium salts. These organic, inorganic acids and/or salts thereof may be used alone or in combination.

The amount of these organic, inorganic acids and/or salts thereof to be added to the dampening water composition (practically employed) preferably ranges from 0.001 to 1% by weight and is appropriately selected such that pH of the resulting composition ranges from 3 to 7. Alternatively, the dampening water composition can also be used in an alkaline region (pH 7 to 11) if alkali metal hydroxides, alkali metal phosphates, alkali metal carbonates and/or silicates are used as the pH-buffering component.

The dampening water composition may optionally comprise a wetting agent. The wetting agents usable in the invention are, for instance, polyols, glycol ethers, alcohols and surfactants. Specific examples of polyols and glycol ethers includes 2-ethyl-1,3-hexanediol, hexyl cellosolve, hexyl carbitol, ethylene glycol, diethylene glycol, triethylene glycol, propylene glycol, dipropylene glycol, tripropylene glycol, hexylene glycol, tetraethylene glycol, 1,5-pentanediol, glycerin, diglycerin, ethylene glycol monomethyl ether, diethylene glycol monomethyl ether, triethylene glycol monomethyl ether, polyethylene glycol monomethyl ether, propylene glycol monomethyl ether, dipropylene glycol monomethyl ether, ethylene glycol monopropyl ether, diethylene glycol monopropyl ether, propylene glycol monopropyl ether, dipropylene glycol monopropyl ether, ethylene glycol monoisopropyl ether, diethylene glycol monoisopropyl ether, ethylene glycol monobutyl ether, diethylene glycol monobutyl ether, triethylene glycol monobutyl ether, dipropylene glycol monobutyl ether, ethylene glycol monoisobutyl ether, diethylene glycol monoisobutyl ether, ethylene glycol monoallyl ether, ethylene glycol monophenyl ether, diethylene glycol monophenyl ether, ethylene oxide adduct of 2-ethyl-1,3-hexanediol, acetylene glycol and ethylene oxide adducts thereof and polypropylene glycol (molecular weight: 200 to 1,000).

Specific examples of alcohols are ethyl alcohol, n-propyl alcohol, isopropyl alcohol, butyl alcohol, isobutyl alcohol, n-amyl alcohol and benzyl alcohol.

Surfactants usable in the present invention may be anionic, nonionic and cationic ones. Specific examples of anionic surfactants include fatty acid salts, abietic acid salts, hydroxyalkanesulfonic acid salts, alkanesulfonic acid salts, dialkylsulfosuccinic acid salts, linear alkylbenzenesulfonic acid salts, branched alkylbenzenesulfonic acid salts, alkylnaphthalenesulfonic acid salts, alkylphenoxy polyoxyethylenepropylsulfonic acid salts, polyoxyethylene alkyl sulfophenyl ether salts, sodium salt of N-methyl-N-oleyltaurine, disodium N-alkylsulfosuccinic acid monoamide, petroleum sulfonate, sulfated castor oil, sulfated tallow oil, sulfuric acid ester salts of fatty acid alkyl esters, alkyl sulfuric acid ester salts, polyoxyethylene alkyl ether sulfuric acid ester salts, fatty acid monoglyceride sulfuric acid ester salts, polyoxyethylene alkylphenyl ether sulfuric acid ester salts, polyoxyethylene styrylphenyl ether sulfuric acid ester salts, alkylphosphoric acid ester salts, polyoxyethylene alkyl ether phosphoric acid ester salts, polyoxyethylene alkylphenyl ether phosphoric acid ester salts, partially saponified products of styrene-maleic anhydride copolymer, partially saponified products of olefin maleic anhydride copolymer and condensates of naphthalenesulfonic acid salt and formaline.

Among these, particularly preferred are dialkylsulfosuccinic acid salts, alkylsulfuric acid ester salts and alkylnaphthalenesulfonic acid salts.

Specific examples of nonionic surfactants are polyoxyethylene alkyl ether, polyoxyethylene alkylphenyl ether, polyoxyethylene polystyrylphenyl ether, polyoxyethylene polyoxypropylene alkyl ether, partially esterified glycerin fatty acid, partially esterified sorbitan fatty acid, partially esterified pentaerythritol fatty acid, propylene glycol monofatty acid ester, partially esterified sucrose fatty acid, partially esterified polyoxyethylene sorbitan fatty acid, partially esterified polyoxyethylene sorbitol fatty acid, polyethylene glycol fatty acid ester, partially esterified polyglycerin fatty acid, polyoxyethylene-modified castor oil, partially esterified polyoxyethylene glycerin fatty acid, fatty acid diethanolamide, N,N-bis-2-hydroxyalkylamine, polyoxyethylene alkylamine, triethanolamine fatty acid ester and trialkylamine oxide. Among these, preferably used are polyoxyethylene alkylphenyl ether and polyoxyethylenepolyoxypropylene block copolymer.

Examples of cationic surfactants are alkylamine salts, quaternary ammonium salts, polyoxyethylene alkylamine salts and polyethylene polyamine derivatives (fluorine atom-containing silicone surfactants).

These wetting agents may be used alone or in combination. The amount thereof to be incorporated into the dampening water composition (practically employed) preferably ranges from 0.03 to 5% by weight.

The dampening water composition may further comprise a preservative and specific examples thereof include phenol or derivatives thereof, formalin, imidazole derivatives, sodium dehydroacetate, 4-isothiazolin-3-one derivatives, benzotriazole derivatives, amidine-guanidine derivatives, quaternary ammonium salts, pyridine, quinoline, guanidine derivatives, diazine, triazole derivatives, oxazole and oxazine derivatives. These preservatives are used in such an amount that they can effectively and steadily inhibit the growth of bacteria, mold, yeast or the like and the amount thereof varies depending on the kinds of bacteria, mold, yeast or the like to be controlled, but preferably ranges from 0.001 to 1% by weight on the basis of the total weight of the dampening water composition practically used. In this respect, these preservatives are preferably used in combination so that the composition is effective for controlling various kinds of mold and bacteria.

The dampening water composition may optionally comprise an antifoaming agent which may be either emulsions or solutions of silicone type and which is preferably compounds exhibiting the effect even in a small amount. The amount thereof thus preferably ranges from 0.001 to 0.3% by weight on the basis of the total weight of the dampening water composition practically used.

The dampening water composition of the invention may optionally comprise a chelating compound in addition to the foregoing components.

Currently, the dampening water composition is properly diluted with a diluent such as tap water or well water and then put to practical use. The tap water or well water as the diluent contains calcium ions or the like which adversely affect the printing operation and become a cause of easy contamination of printed matters. However, this problem can effectively be eliminated by incorporating a chelating agent into the composition.

Examples thereof preferably used in the present invention are organic phosphonic acids or phosphonoalkanetricarboxylic acids such as ethylenediaminetetraacetic acid and potassium and sodium salts thereof; diethylenetriaminepentaacetic acid and potassium and sodium salts thereof; triethylenetetraminehexaacetic acid and potassium and sodium salts thereof; hydroxyethylethylenediaminetriacetic acid and potassium and sodium salts thereof; nitrilotriacetic acid and potassium and sodium salts thereof; 1-hydroxyethane-1,1-diphosphonic acid and potassium and sodium salts thereof; and aminotri(methylenephosphonic acid) and potassium and sodium salts thereof. Organic amine salts of the foregoing organic phosphonic acids or phosphonoalkane tricarboxylic acids can likewise effectively be used in the invention instead of or in combination with the foregoing potassium and sodium salts.

The chelating agent is selected from those which are present in the dampening water composition in the stable state and never inhibit the printing properties. The amount thereof to be added to the dampening water composition in general ranges from 0.001 to 5% by weight and preferably 0.005 to 1% by weight on the basis of the total weight of the composition practically used.

Further, the dampening water composition of the present invention may comprise other additives such as various kinds of coloring agents and anticorrosive agents. For instance, coloring agent may preferably be food dyes. Examples of such dyes include yellow dyes such as CI Nos. 19140 and 15985; red dyes such as CI Nos. 16185, 45430, 16255, 45380 and 45100; purple dyes such as CI No. 42640; blue dyes such as CI Nos. 42090 and 73015; and green dyes such as CI No. 42095.

Moreover, the composition may comprise an agent for preventing contamination of non image areas due to oxidation such as magnesium nitrate, zinc nitrate or sodium nitrate.

It is economical and preferred to prepare the dampening water composition of the invention as a concentrated solution which is diluted several ten times to several hundred times prior to the practical use.

The dampening water composition of the present invention can effectively suppress the corrosion of copper or copper alloy-plated rolls of a printing press as well as cast iron or nickel-plated cast iron parts thereof without impairing printing effects and printability.

The present invention will hereunder be explained in more detail with reference to the following non-limitative working Examples and the effects practically achieved by the present invention will also be discussed in detail in comparison with Comparative Examples given below. In the following Examples and Comparative Examples, the term "%" means "% by weight" unless otherwise specified.

EXAMPLE

Dampening water compositions 1 to 5 according to the present invention and a comparative composition 6 were prepared. The detailed formulations of these dampening water compositions are summarized in the following Table 1.

TABLE 1

Formulations of the Dampening Water Compositions

| | Amount Incorporated (%) Example No. | | | | | |
|---|---|---|---|---|---|---|
| | 1 | 2 | 3 | 4 | 5 | 6 |
| (1) Film-forming Polymer | | | | | | |
| gum arabic | 0.015 | — | — | 0.01 | — | 0.015 |
| hydroxypropyl cellulose | — | 0.015 | — | 0.005 | 0.01 | — |
| carboxymethyl cellulose | — | — | 0.015 | — | 0.01 | — |
| (2) pH-Buffering Agent | | | | | | |
| magnesium nitrate | 0.3 | 0.3 | 0.3 | 0.3 | 0.3 | 0.3 |
| phosphoric acid | 0.13 | 0.13 | 0.13 | 0.13 | 0.13 | 0.13 |
| monoammonium citrate | 0.13 | 0.13 | 0.13 | 0.13 | 0.13 | 0.13 |
| (3) Anticorrosive agent | | | | | | |
| benzimidazole | 0.003 | — | — | — | — | — |
| 5-methoxy-2-mercapto-benzimidazole | — | 0.003 | — | — | 0.002 | — |

TABLE 1-continued

| Formulations of the Dampening Water Compositions | Amount Incorporated (%) Example No. | | | | | |
|---|---|---|---|---|---|---|
| | 1 | 2 | 3 | 4 | 5 | 6 |
| 2-mercaptobenzimidazole | — | — | 0.003 | — | — | — |
| sodium 2-mercaptobenz-imidazole-5-sulfonate | — | — | — | 0.003 | 0.001 | — |
| (4) Wetting Agent | | | | | | |
| IPA (isopropyl alcohol) | 10 | — | — | — | — | 10 |
| ethylene glycol mono-butyl ether | — | 1 | 0.8 | — | 0.5 | — |
| octylene glycol | — | — | 0.2 | — | — | — |
| octylene glycol (2 moles ethylene oxide adduct) | — | — | — | 1 | 0.5 | — |

(NOTE)
1: Water was added to give 100 ml of each solution.
2: pH was adjusted to 5.0 to 5.5 by the addition of KOH.

TEST EXAMPLE 1

An amount of 50 ml each of the dampening water compositions was taken and each test plate (2 $cm^2$) was immersed therein for 72 hours. All of the test plates tested, i.e., copper, brass, cast iron, nickel-plated cast iron and steel (material for spring) plates were only slightly corroded and became discolored. To quantitatively examine the corrosion by the dampening water, the total amount of each metal dissolved in each dampening water was determined using an atomic absorption spectrophotometer. The results obtained are summarized in the following Table 2 (each numerical value in this Table is expressed in terms of ppm unit).

TABLE 2

Results of Atomic Absorption Spectrophotometry

| | Present Invention | | | | | Comp. Ex. |
|---|---|---|---|---|---|---|
| Test Plate | 1 | 2 | 3 | 4 | 5 | 6 |
| copper | 0.17 | 0.16 | 0.11 | 0.22 | 0.09 | 41 |
| brass | 0.18 | 0.04 | 0.08 | 0.24 | 0.05 | 16 |
| cast iron | 5.85 | 5.50 | 5.9 | 9.6 | 3.25 | 122 |
| cast iron (Ni-plated) | 0.08 | 0.08 | 0.05 | 0.12 | 0.04 | 28 |
| steel (material for spring) | 2.4 | 2.1 | 2.3 | 2.9 | 1.8 | 229 |

As seen from Table 2, the dampening water compositions 1 to 5 of the present invention clearly exert corrosion-inibitory effect on every metals higher than that observed for the comparative dampening water composition.

On the other hand, FPS-II (anodized multigrain type positive-working PS plate; available from Fuji Photo Film Co., Ltd.) was exposed to light, then developed and gummed up using PS Automated Developing Machine 800 EII, a developer for positive-working PS plate DP-4 (diluted 8 times with water) and Finisher FP for positive working PS plate (diluted 2 times with water) (all of these are available from Fuji Photo Film Co., Ltd.) to give a lithographic printing plate. The resulting plate was attached to KOMORI LITHRON PRINTING PRESS (equipped with KOMORI STICK) and printing operation was performed to evaluate the following properties of the dampening water compositions.

a. Contamination of Metering Roll: The extent of contamination, with an ink, of the metering roll for sending water up was examined and evaluated on the basis of the following criteria:

○: not contaminated
Δ: slightly contaminated
X: severely contaminated

Bleeding: The printing operation was interrupted after printing 5000 and 10000 copies with an ink (available from Dainippon Ink and Chemicals, Inc.; Apex G, Red S), the extent of bleeding the ink from the image area to the non-image area was determined and evaluated on the basis of the following criteria:

○: almost no bleeding
Δ: bleeding was slightly observed
X: severe bleeding was observed c. Emulsifying Ability: After printing 10000 copies, the emulsified condition of the ink on the ink mxing rolls was examined and evaluated on the basis of the following criteria:

○: well emulsified
Δ: slightly emulsified
X: not emulsified d. Duration of Stability: Pure water was used as a dampening water, printing operation was continued to determine the critical amount of the dampening water required for obtaining 10000 copies free of contamination (the minimum amount of sent-up water). Then the printing operation was performed while using each dampening water composition in an amount corresponding to the minimum amount of sent-up water to determine the number of contamination-free copies obtained.

○: not less than 10000 copies
Δ: less than 10000 and not less than 3000
X: less than 3000

As a result, it was found that all of the dampening water compositions of the foregoing Examples were excellent in all of the properties examined, i.e., a. contamination of metering roll; b. bleeding; c. emulsifying ability; and d. duration of stability and could provide good copies. The results thus obtained are listed in the following Table 3.

TABLE 3

| | Present Invention | | | | | Comp. Ex. |
|---|---|---|---|---|---|---|
| Property Tested | 1 | 2 | 3 | 4 | 5 | 6 |
| Contamination of Metering Roll | ○ | ○ | ○ | ○ | ○ | ○ |
| Ink Bleeding | ○ | ○ | ○ | ○ | ○ | ○ |
| Emulsifying Abvility | ○ | ○ | ○ | ○ | ○ | ○ |
| Duration of Stability | ○ | ○ | ○ | ○ | ○ | ○ |

What is claimed is:

1. In a dampening water composition for lithographic printing plate comprising a hydrophilic polymer having a film-forming ability and a pH-buffering substance, the improvement characterized in that said composition further comprises at least one compound selected from the group consisting of benzimidazole and derivatives thereof.

2. The dampening water composition of claim 1 wherein the benzimidazole and derivatives thereof are selected from the group consisting of those represented by the following general formula (I):

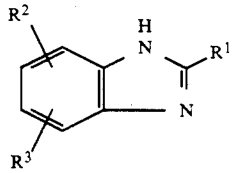

(I)

wherein $R^1$ represents H, SH, Cl or Br; and $R^2$ and $R^3$ each independently represents H, a $C_1$ to $C_5$ alkyl or alkoxy group, a halogen atom or $SO_3M$ wherein M represents H, an alkali metal or $NH_4$) .

3. The dampening water composition of claim 2 wherein the halogen atom is Cl or Br.

4. The dampening water composition of claim 1 wherein the amount of the benzimidazole and derivatives thereof ranges from 0.0001 to 5% by weight on the basis of the weight of the composition practically used.

5. The dampening water composition of claim 4 wherein the amount of the benzimidazole and derivatives thereof ranges from 0.0002 to 3% by weight on the basis of the weight of the composition practically used.

6. The dampening water composition of claim 1 wherein the amount of the hydrophilic polymer is incorporated into the dampening water composition at a concentration thereof in the practically used dampening water composition ranging from 0.005 to 1% by weight.

7. The dampening water composition of claim 6 wherein the hydrophilic polymer is at least one member selected from the group consisting of gum arabic, dextrin, enzyme-decomposed dextrin, hydroxypropylated enzyme-decomposed dextrin, carboxymethylated starch, phosphated starch, octenylsuccinylated starch, alginic acid salts, carboxymethyl cellulose, carboxyethyl cellulose, hydroxyethyl cellulose, methyl cellulose, hydroxypropyl cellulose, hydroxypropylmethyl cellulose, glyoxal modified cellulose derivatives, polyethylene glycol and copolymer thereof, polyvinyl alcohol and derivatives thereof, polyvinyl pyrrolidone, polyacrylamide and copolymer thereof, polyacrylic acid and copolymer thereof, vinyl methyl ether/maleic anhydride copolymer, vinyl acetate/maleic anhydride copolymer and polystyrenesulfonic acid and copolymer thereof.

8. The dampening water composition of claim 1 wherein the amount of the pH-buffering agent ranges from 0.001 to 1% by weight on the basis of the dampening water composition practically used.

9. The dampening water composition of claim 8 wherein the PH-buffering agent is at least one member selected from the group consisting of water-soluble organic acids, water-soluble inorganic acids and salts thereof.

10. The dampening water composition of claim 9 wherein the pH-buffering agent is at least one member selected from the group consisting of citric acid, ascorbic acid, malic acid, tartric acid, lactic acid, acetic acid, gluconic acid, hydroxyacetic acid, oxalic acid, malonic acid, levulinic acid, sulfanilic acid, p-toluenesulfonic acid, phytic acid, organic phosphonic acid, phosphoric acid, metaphosphoric acid, nitric acid, sulfuric acid, alkali metal salts, alkaline earth metal salts and ammonium salts of these organic and/or inorganic acids.

11. The dampening water composition of claim 1 wherein it further comprises a wetting agent selected from the group consisting of polyols, glycol ethers, alcohols and surfactants.

12. The dampening water composition of claim 11 wherein the amount of the wetting agent ranges from 0.03 to 5% by weight on the basis of the dampening water composition practically employed.

13. The dampening water composition of claim 1 wherein it further comprises a preservative selected from the group consisting of phenol or derivatives thereof, formalin, imidazole derivatives, sodium dehydroacetate, 4-isothiazolin-3-one derivatives, benzotriazole derivatives, amidine-guanidine derivatives, quaternary ammonium salts, pyridine, quinoline, guanidine derivatives, diazine, triazole derivatives, oxazole and oxazine derivatives.

14. The dampening water composition of claim 13 wherein it comprises at least two preservatives.

15. The dampening water composition of claim 13 wherein the amount of the preservative ranges from 0.001 to 1% by weight on the basis of the total weight of the dampening water composition practically used.

16. The dampening water composition of claim 1 wherein it further comprises at least one chelating agent selected from the group consisting of ethylenediaminetetraacetic acid and potassium and sodium salts thereof; diethylenetriaminepentaacetic acid and potassium and sodium salts thereof; triethylene-tetraminehexaacetic acid and potassium and sodium salts thereof; hydroxyethylethylenediaminetriacetic acid and potassium and sodium salts thereof; nitrilotriacetic acid and potassium and sodium salts thereof; 1-hydroxyethane-1,1-diphosphonic acid and potassium and sodium salts thereof; aminotri(methylenephosphonic acid) and potassium and sodium salts thereof; and organic amine salts of the foregoing acids.

17. The dampening water composition of claim 16 wherein the amount of the chelating agent ranges from 0.001 to 5% by weight on the basis of the dampening water composition practically used.

18. The dampening water composition of claim 17 wherein the amount of the chelating agent ranges from 0.005 to 1% by weight on the basis of the dampening water composition practically used.

19. The dampening water composition of claim 1 wherein it further comprises at least one antifoaming agent.

20. A method of lithographic printing comprising the steps of applying to a lithographic printing plate having an ink-receptive oleophilic area and a hydrophilic area on the printing surface of the plate, an ink and the dampening water composition of claim 1, and transferring the ink on the oleophilic area to the surface of a substrate to be printed.

* * * * *